(12) United States Patent
Hasui et al.

(10) Patent No.: US 6,920,255 B2
(45) Date of Patent: Jul. 19, 2005

(54) POLARIZER-EQUIPPED OPTICAL FIBER FERRULE, CONNECTOR AND CONNECTOR ADAPTOR

(75) Inventors: Kenjiro Hasui, Shizuoka (JP); Kouichi Muro, Shizuoka (JP); Yoshiaki Takeuchi, Shizuoka (JP)

(73) Assignee: Corning Incorporated, Corning, NY (US)

( * ) Notice: Subject to any disclaimer, the term of this patent is extended or adjusted under 35 U.S.C. 154(b) by 109 days.

(21) Appl. No.: 10/344,439

(22) PCT Filed: Aug. 29, 2001

(86) PCT No.: PCT/JP01/07423
§ 371 (c)(1),
(2), (4) Date: Feb. 10, 2003

(87) PCT Pub. No.: WO02/19002
PCT Pub. Date: Mar. 7, 2002

(65) Prior Publication Data
US 2003/0174922 A1 Sep. 18, 2003

(30) Foreign Application Priority Data
Aug. 31, 2000 (JP) .................................. 2000-263074

(51) Int. Cl.[7] .............................................. G02B 6/00
(52) U.S. Cl. ..................................................... 385/11
(58) Field of Search ................................ 385/11, 60, 72, 385/73, 78

(56) References Cited

U.S. PATENT DOCUMENTS

| | | | | | |
|---|---|---|---|---|---|
| 5,325,456 | A | * | 6/1994 | Cullen et al. | 385/138 |
| 5,706,371 | A | * | 1/1998 | Pan | 385/11 |
| 5,734,762 | A | * | 3/1998 | Ho et al. | 385/11 |
| 6,048,103 | A | * | 4/2000 | Furukata et al. | 385/73 |
| 6,485,191 | B1 | * | 11/2002 | Sato | 385/73 |
| 6,535,655 | B1 | * | 3/2003 | Hasui et al. | 385/11 |
| 6,760,495 | B2 | * | 7/2004 | Gonthier et al. | 385/11 |

FOREIGN PATENT DOCUMENTS

| | | | | |
|---|---|---|---|---|
| EP | 0751410 | * | 1/1997 | 385/11 |
| JP | 5-060934 | | 3/1993 | G02B/6/26 |
| JP | 5-55122 | | 7/1993 | G02B/27/28 |

* cited by examiner

*Primary Examiner*—Rodney Bovernick
*Assistant Examiner*—Mike Stahl
(74) *Attorney, Agent, or Firm*—Timothy M. Schaeberle

(57) ABSTRACT

The present invention provides a polarizer-attached optical fiber ferrule, a polarizer-attached optical fiber connector, and a polarized-attached optical fiber connector adapter for coupling a linear polarizer with one or more optical fibers without employing a lens. The polarizer-attached optical fiber connector 2 is equipped with an optical fiber 10, a ferrule 5 fitted on the periphery of the optical fiber 10 and equipped with a slit 16 reaching the optical fiber 10, and a linear polarizer 18 inserted into the slit 16 so that it crosses the optical fiber 10.

21 Claims, 5 Drawing Sheets

F I G . 2
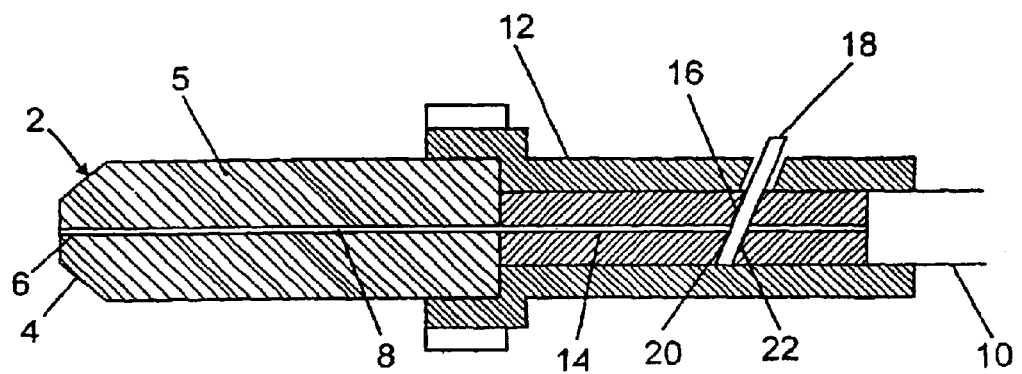

F I G . 4
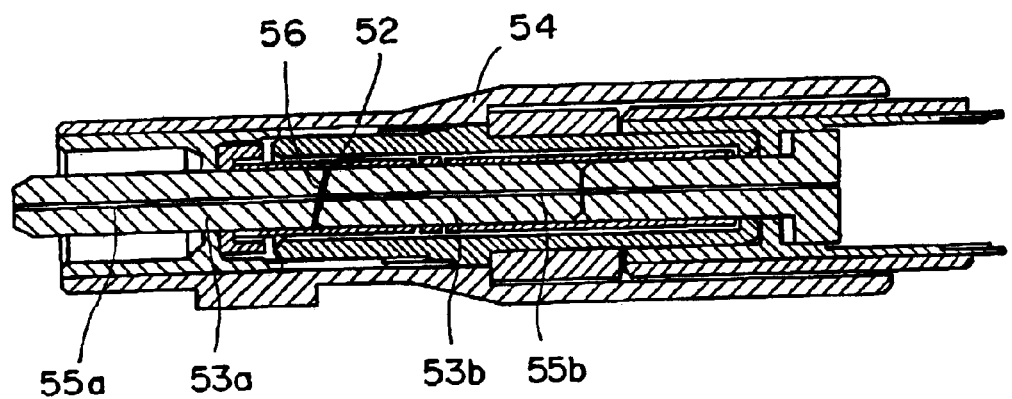

POLARIZER-EQUIPPED OPTICAL FIBER FERRULE, CONNECTOR AND CONNECTOR ADAPTOR

TECHNICAL FIELD

The present invention relates to a polarizer-attached optical fiber ferrule, a polarizer-attached optical fiber connector, and a polarized-attached optical fiber connector adapter.

BACKGROUND ART

It is known that optical fiber technology has a wide variety of applications in communication systems. Copper lines, coaxial cables, and in certain cases microwave relays and satellites, have been replaced with optical fiber communication systems. Optical fiber systems are particularly attractive with regard to long-distance communication, because it has the ability to transmit enormous information and is less susceptible to electromagnetic interference. Optical fiber links are useful in transmitting a signal over an extremely short distance, for example, between a large general-purpose computer and its peripheral equipment. Optical fiber transmission systems are also employed to transmit a signal between circuit boards within a computer. Various investigations have also been made with respect to the connection of optical fibers at a low level, such as the connection between microchips. Optical fiber systems are also employed as sensors for sensing pressure, liquid level, temperature, magnetic field, acidity, and other stimuli. These optical fiber sensors are generally based on a conversion mechanism that depends on a change in the polarization of light passing through the sensors. The light polarization is changed by an external stimulus.

Optical fiber systems are equipped with three main components, which include a transmitter for converting a data signal to an optical signal, an optical fiber for guiding the optical signal, and a receiver for capturing the optical signal at the other end of the optical fiber and converting it to an electrical signal. A light source in the transmitter can be a semiconductor laser diode or a light-emitting diode (LED). An LED is a light source of relatively low output which operates at a lower data transmission ratio than that of a laser diode. For applications requiring high-speed data transmission or long-distance communication, a laser diode is preferred. Light emitted from a light source is modulated to convert an optical signal to a data signal.

The linearly polarized light produced by the semiconductor laser diode is very effective in many communication or measurement systems employing optical fibers. However, the extinction ratio of light emitted from the laser diode is approximately 20 dB, and this value is not always stable. Also, it cannot be said that the extinction ratio is sufficiently high for many applications. For instance, there is demand for an extinction ratio of 40 dB or greater. To meet this demand for a laser light having such a high extinction ratio, a laser module with a polarized-wave rotating function has been put into practical use as a light source, and in an optical transmission path, a fiber polarizer, etc., have been put into practical use. These elements generally require the following technique and construction. The technique and construction is to pass laser light through a linear polarizer having a higher extinction ratio than that of the laser light being guided. To achieve the technique and construction, a multiplicity of methods have been proposed.

A linear polarizer that is employed for the aforementioned object is used as a single element. A Glan-Thompson prism, a PBS, POLARCOR (trade name), etc., are polarizers that are commonly used. These linear polarizers generally require a lens system to couple with an optical fiber. A lens that is employed in the lens system is generally costly, and it is necessary to align the lens with an optical fiber in three dimensions with submicron accuracy to couple them. This alignment step is extremely complicated and difficult. Therefore, there is demand for a reduction in the number of components and simplification of the alignment step.

If the thickness of a polarizer is so thin that there is no considerable loss, when disposed between optical waveguides, a lens will not be required in order to couple the polarizer with the optical fiber. Furthermore, a certain construction makes it possible to apply a polarizer without a complicated alignment step. As a linear polarizer with such an extremely thin thickness, there is known "LAMIPOL" (trade name) whose thickness is about 30 $\mu$m. "LAMIPOL" is employed in optical-fiber applications employing no lens. However, the effective aperture of "LAMIPOL" is so small that the resultant assembly step is fairly difficult. Therefore, the step is still complicated. Since "LAMIPOL" has a laminated structure, the optical characteristics vary largely because of a change in the incidence angle of light. Because of this, the inclination of an element for suppression of reflected return light cannot be utilized. This element inclination is indispensable for optical-fiber applications and puts restrictions on the application of "LAMIPOL." In addition, since "LAMIPOL" consists of alternate layers of which thermal expansion coefficients are significantly different, there is another problem that the optical characteristic will be lost by high-energy irradiation such as high-power laser irradiation and high-temperature processing. Therefore, "LAMIPOL" is limited to applications where light intensity is relative low, as in fiber polarizers and polarized-light output fiber collimators. Thus, an optical system employing "LAMIPOL" has the advantage of not using a lens, but, as described above, is rather restricted in applicable use.

On the other hand, a wavelength selecting filter, which is employed for wavelength-multiplexing communication employing optical fibers, can be made nearly the same thickness as the above-mentioned "LAMIPOL." Therefore, the wavelength selecting filter can be applied to optical fibers without using lenses. For example, a slit is formed in a connector so that it crosses an optical fiber, and the wavelength selecting fiber is inserted into the slit. In addition, some wave plates made of polyimide, etc., can be formed to a thickness less than the aforementioned thickness, and there has also been provided an element with a slit into which a wave plate is inserted. These filters require no lens because they are thin. However, since the optical characteristic of the optical filter depends largely on an angle of incidence, an additional design is required for the filter, and the slit needs to be formed with a high degree of accuracy so that the filter can be inserted at a desired angle.

SUMMARY OF THE INVENTION

The present invention has been directed to an optical fiber connector and an optical fiber connector adapter that are inevitably employed as connectors in both a light source and an optical transmission path. Furthermore, the invention has been directed to an optical fiber ferrule that is always used in both the optical fiber connector and the optical fiber connector adapter. It is an object of the present invention to provide a polarizer-attached optical fiber ferrule, a polarizer-attached optical fiber connector, and a polarizer-attached optical fiber connector adapter that are capable of producing laser light which has a high extinction ratio.

Another object of the present invention is to provide a polarizer-attached optical fiber ferrule, a polarizer-attached optical fiber connector, and a polarizer-attached optical fiber connector adapter which are capable of reducing the number of components and the manufacturing costs, as well as facilitating the manufacturing step.

In accordance with the present invention, there is provided a polarizer-attached optical fiber ferrule comprising: an optical fiber; a ferrule, fitted on the periphery of the optical fiber, and equipped with a slit reaching the optical fiber; and a linear polarizer inserted into the slit so that it crosses the optical fiber.

Also, there is provided a polarizer-attached optical fiber connector comprising: an optical fiber; a connector ferrule, fitted on the periphery of the optical fiber, and equipped with a slit reaching the optical fiber; and a linear polarizer inserted into the slit so that it crosses the optical fiber.

In addition, there is provided a polarizer-attached optical fiber connector adapter comprising: an optical fiber; two adapter ferrules, fitted on the periphery of the optical fiber, and fixed within an alignment sleeve; and a linear polarizer inserted between the ferrules.

Furthermore, there is provided a polarizer-attached optical fiber connector adapter comprising: an optical fiber; an adapter ferrule, fitted on the periphery of the optical fiber, and equipped with within a slit reaching the optical fiber; and a linear polarizer inserted into the slit so that it crosses the optical fiber.

The above-mentioned linear polarizer may be a dichroic glass polarizer. The aforementioned slit may be inclined with respect to an axial direction of the optical fiber.

The aforementioned fiber may be a single-mode fiber or, and more preferably polarized-wave holding fiber.

It is preferable that the aforementioned linear polarizer have a polarizing angle which aligns with a polarization direction of a laser beam. The aforementioned optical fiber may comprise one or more optical fibers.

The polarizer-attached optical fiber ferrule, the polarizer-attached optical fiber connector, and the polarizer-attached optical fiber connector adapter of the present invention are equipped with a ferrule with a slit reaching an optical fiber, and a linear polarizer inserted into the slit so that it crosses an optical fiber. Therefore, they do not require an additional component such as a lens, etc. Also, since only the linear polarizer is inserted into the slit, a complicated alignment step is unnecessary. These render it possible to produce laser light that has a high extinction ratio. In addition, the number of components and the manufacturing costs can be reduced and the manufacturing step can be facilitated.

Furthermore, the polarizer-attached optical fiber connector adapter of the present invention is equipped with the two ferrules fixed within an alignment sleeve, and the linear polarizer inserted between the ferrules. Therefore, laser light with a high extinction ratio can be produced. In addition, the number of components and the manufacturing costs can be reduced and the manufacturing step can be facilitated.

In the case where the above-mentioned linear polarizer is a dichroic glass polarizer, it can absorb all the unpolarized components. In addition, in the case where the aforementioned slit is inclined with respect to the axial direction of the optical fiber, reflected return light becomes so small that it is negligible.

In the case where the aforementioned fiber is a single-mode fiber, it is suitable for high-volume transfer requiring broad-band characteristics.

BRIEF DESCRIPTION OF THE DRAWINGS

FIG. 2 is a sectional view showing a polarizer-attached optical fiber connector according to a second embodiment of the present invention;

FIG. 4 is a sectional view showing a polarizer-attached optical fiber connector adapter according to a fourth embodiment of the present invention.

BEST MODE FOR CARRYING OUT THE INVENTION

Preferred embodiments of the present invention will hereinafter be described in detail with reference to the accompanying drawings. According to the embodiments of the present invention, there are provided a polarizer-attached optical fiber ferrule, a polarizer-attached optical fiber connector, and a polarizer-attached optical fiber connector adapter which couple a linear polarizer with one or more optical fibers without employing a lens system. The basic principle of the embodiments of the present invention is that the linear polarizer is inserted into the ferrule so that it crosses the optical fiber. The linear polarizer is inserted into a slit formed in the ferrule so that it crosses the optical fiber.

The effectiveness of the polarizer-attached optical fiber ferrule, the polarizer-attached optical fiber connector, and the polarizer-attached optical fiber connector adapter depends on the selection of the linear polarizer. It is preferable that the linear polarizer be very thin in order to minimize the coupling loss. It is preferable that the thickness of the linear polarizer be about 50 $\mu$m or less. The linear polarizer should have an extinction ratio far higher than that of a laser diode to enhance the extinction ratio of the laser diode. Furthermore, it is necessary that the linear polarizer be a dichroic polarizer which absorbs one polarization component and transmits the other polarization component. It is preferable that the linear polarizer have high resistance to laser-irradiation damage. It is preferable that the linear polarizer have a large aperture so that it is easily fitted on an optical fiber so as to cross the optical fiber. It is preferable that the linear polarizer be practically insensitive to a change in an angle of incidence, that is, have a large acceptance angle, so that in order to reduce reflected light that returns to the incident side, the polarizer can be disposed at an angle inclined slightly from a plane vertical to the optical axis of the fiber. It is preferable that the linear polarizer have the same refractive index as that of an optical fiber core, that is, an optical waveguide.

Figure 1:
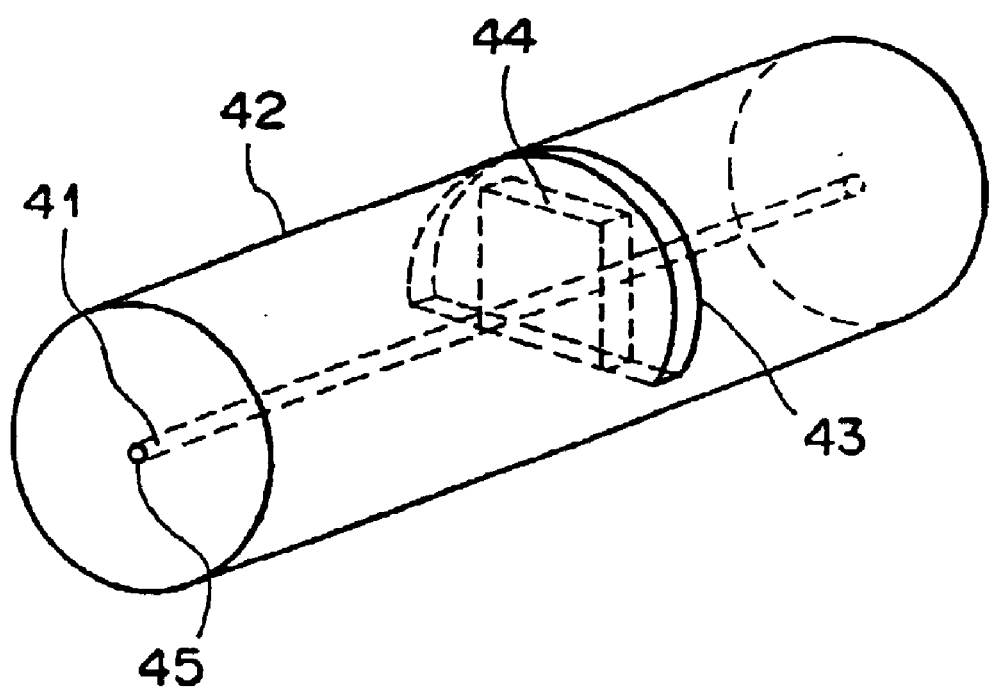
FIG. 1 is a perspective view showing a polarizer-attached optical fiber ferrule according to a first embodiment of the present invention.

Now, various embodiments of the present invention will be described with reference to the drawings. FIG. 1 shows a schematic diagram of a polarizer-attached optical fiber ferrule 42 equipped with a slit 43 reaching an optical fiber. The ferrule 42 has a center pore 45 to which a bare fiber 41 is inserted and fixed. The slit 43 is formed in the ferrule 42 so that it crosses the bare fiber 41. A linear polarizer 44 is inserted into the slit 43, which is in turn formed at an angle inclined slightly from a plane vertical to the axis direction of the bare fiber 41. This polarizer-attached optical fiber ferrule 42 is the basis of the present invention. The present invention includes any type of optical component, for example, an optical fiber connector, an optical fiber connector adapter, etc., as long as it employs the ferrule 42. FIG. 1 shows the single-fiber ferrule to which a single fiber is fixed. However, the present invention is also applicable to a multi-fiber ferrule to which two or more fibers are fixed. Subsequently, a description will be given of applications equipped with the polarizer-attached optical fiber ferrule 42.

FIG. 2 shows a polarizer-attached optical fiber connector 2 equipped with a connector ferrule 4. The connector ferrule 4 includes a ferrule 5 formable with ceramic material, and has a center pore 6 into which the bare fiber portion 8 of an optical fiber 10 is inserted. The ferrule 5 is fixed by a ferrule supporting body 12 such as a metal fixing flange. The ferrule supporting body 12 is equipped with a center pore 14 for receiving part of the bare fiber portion 8 of the optical fiber 10. A slit 16 is formed from the ferrule supporting body 12 toward the bare fiber portion 8. This slit 16 is formed at an angle inclined slightly from a plane vertical to the bare fiber portion 8. When the ferrule 5 has sufficient mechanical strength, the slit 16 may be formed in the ferrule 5 near the ferrule supporting body 12.

Referring to FIG. 2, a linear polarizer 18 is inserted into the slit 16. This linear polarizer 18 can be fixed, for example, with an adhesive. The linear polarizer 18 may be provided with a rotation mechanism (not shown) to obtain a desired polarization direction as required, by rotating the plane of the linear polarizer 18 vertical to the optical axis direction of the optical fiber 10.

The polarizer-attached optical fiber connector 2 is employed in a laser module (not shown), and the rotation axis of the polarizer 18 can be aligned with the polarization axis of laser light produced by a laser diode. With this alignment, if only the polarizer-attached optical fiber connector 2 is connected to a laser module whose extinction ratio is low, it becomes possible to produce laser light that has a high extinction ratio. In addition, since the polarizer 18 is of a dichroic type, as described above, all of the unpolarized components are absorbed. Furthermore, the polarizer 18 is fixed at an angle inclined slightly from a plane vertical to the optical axis of the optical fiber 10 so that the return light reflected by the polarizer 18 is negligible. Therefore, the laser oscillation can be stably held. That is, it becomes possible to enhance the characteristics of ordinary laser modules.

The polarizer-attached optical fiber connector 2 can also be applied to common connectors that are employed in optical transmission path. In this case, the extinction ratio of light propagating through an optical transmission path can be enhanced. That is, the polarizer-attached optical fiber connector fulfills the same function as the fiber polarizer.

The above-mentioned polarizer-attached optical fiber connector 2 requires no addition of an optical component (a lens, etc.) and no special design, because it is manufactured by forming the linear-polarizer inserting slit 16 in a commonly used connector and then inserting and fixing the liner polarizer 18. In addition, a complicated alignment step is also unnecessary, since only the linear polarizer 18 is inserted into the slit 16.

The effectiveness of the polarizer-attached optical fiber connector 2 depends on the selection of the linear polarizer 18. As previously described, the linear polarizer 18 has to be very thin in order to minimize the coupling loss. The linear polarizer must also have a high extinction ratio and a large aperture. Furthermore, it is preferable that the linear polarizer be highly resistant to laser irradiation. It is suitable that the linear polarizer 18 be a dichroic glass polarizer being marketed under the trademark "UltraThin™" by Corning. The "UltraThin™"-polarizer absorbs unpolarized components because it is a dichroic glass polarizer.

"UltraThin™" has a thickness of about 30 $\mu$m, and the extinction ratio is 40 dB and the insertion loss is 0.5 dB or less. That is, it is very thin but is a high-function polarizer with a high extinction ratio and a low insertion loss. The "UltraThin™"-polarizer also has a large light-receiving angle ($\pm 20°$) and a large aperture diameter and has high resistance to laser irradiation. The "UltraThin™"-polarizer further has a refractive index close to the refractive index of the core of the ordinary optical fiber 10. The advantage of having a large light-receiving angle is that the inclined angle of the slit 16 (where 5° is preferred) with respect to the axial direction of the optical fiber 10 can be effectively selected so that reflection at boundaries 20, 22 is suppressed. The advantage of having a large aperture diameter is that the assembly step becomes simple. The advantage of having high resistance to laser irradiation is that the polarizer can be used even when a high-power laser beam is employed. Since the refractive index of "UltraThin™" is nearly the same as that of the optical fiber core, the insertion loss due to insertion of "UltraThin™" can be reduced and the shift of the optical axis of the fiber due to the inclination of the linear polarizer is so small that it is negligible.

Figure 3:
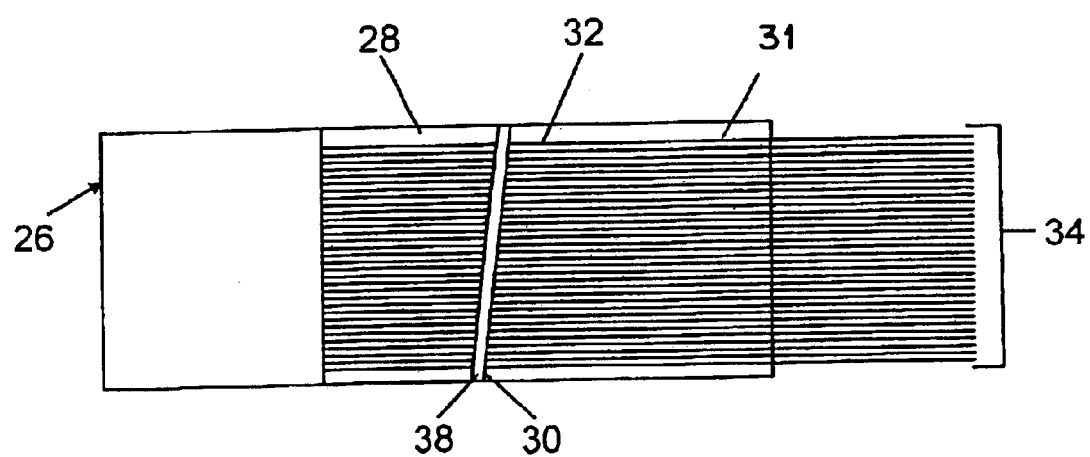
FIG. 3 is a diagram showing a polarizer-attached optical multi-fiber connector according to a third embodiment of the present invention.

The polarizer-attached optical connector 2 is not limited to a single-fiber connector. FIG. 3 shows a polarizer-attached optical multi-fiber connector 26. The polarizer-attached optical multi-fiber connector 26 is equipped with a flat base plate 28. A slit array 31 is formed in the flat base plate 28. A polarizer insertion slit 30 is formed so that it crosses the slit array 31. The bare fiber portions 32 of optical fibers 34 are disposed within the slit array 31. A linear polarizer 38 is disposed within the insertion slit 30. The linear polarizer 38 is inserted at an angle inclined slightly from a plane vertical to the bare fiber portions 32. The linear polarizer 38 can be a dichroic glass polarizer being marketed under the trademark "UltraThin™" by Corning.

In some applications, in the polarizer-attached optical fiber connector 26 it is necessary to enhance the extinction ratio and then maintain the polarization state. In such cases, the linear polarizer is installed in the above-mentioned manner by employing a polarization maintaining fiber connector in common use.

As described above, since no suitable linear polarizer had been put into practical use, it has not been considered possible to install a polarizer in a connector, which is a relatively small optical component. The polarizer-attached optical fiber connector 2 according to the present invention is capable of producing a laser beam which has a high extinction ratio, by being applied to light sources and light transmission paths in currently use.

FIG. 4 shows a cross section of a polarizer-attached optical fiber connector adapter 54, equipped with an adapter ferrule 53. Between two adapter ferrules 53a, 53b, optical fibers 55a, 55b are installed. These adapter ferrules 53a, 53b are fixed to both surfaces of a linear polarizer 52. They can be fixed, for example, with an adhesive. The contact surfaces between the adapter ferrules 53a, 53b and the linear polarizer 52 are inclined with respect to the optical axes of the optical fibers 55a, 55b. In other words, the linear polarizer 52 is disposed in an inclined position with respect to the optical axes of the optical fibers 55a, 55b. The linear polarizer 52 may be provided with a rotation mechanism (not shown) to obtain a desired polarization direction as required, by rotating the plane of the linear polarizer 52 vertical to the optical axes of the optical fibers 55a, 55b.

Figure 5:
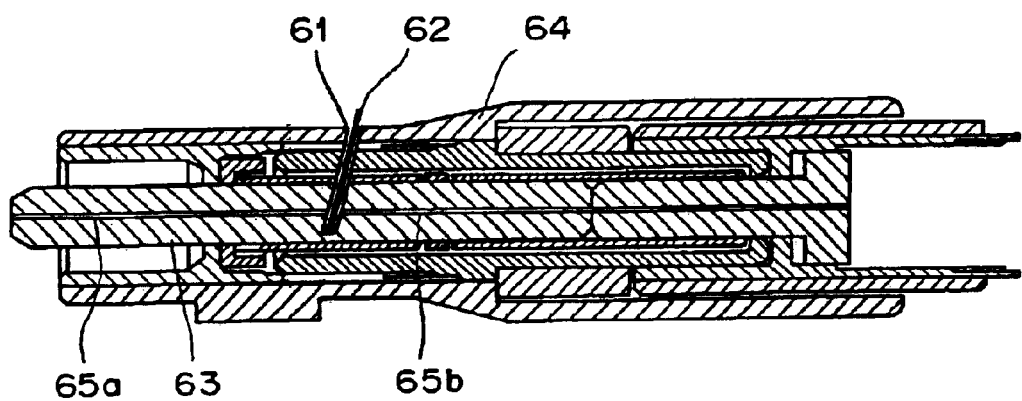
FIG. 5 is a sectional view showing a polarizer-attached optical fiber connector adapter according to a fifth embodiment of the present invention.

FIG. 5 shows a cross section of a polarizer-attached optical fiber connector adapter 64, equipped with an adapter ferrule 63. A slit 61 is formed within the ferrule 63 so that it reaches optical fiber bare portions 65a, 65b. Therefore, the optical fiber fixed to the adapter ferrule 63 is divided into the two optical fiber bare portions 65a, 65b by the slit 61. A linear polarizer 62 is inserted and fixed to the slit 61. The linear polarizer 62 can be fixed, for example, with an adhesive. The contact surfaces between the slit 61 and the linear polarizer 62 are inclined from a plane vertical to the optical axes of the optical fiber portions 65a, 65b. That is, the linear polarizer 62 is disposed in an inclined position with respect to the optical axes of the optical fiber portions 65a, 65b. The linear polarizer 62 may be provided with a rotation mechanism (not shown) to obtain a desired polarization direction as required, by rotating the plane of the linear polarizer 62 vertical to the optical axes of the optical fiber portions 65a, 65b.

The polarizer-attached optical fiber connector adapter 64 is employed in a laser module (not shown), and the rotation axis of the polarizer 62 can be aligned with the polarization axis of laser light produced by a laser diode. With this alignment, if only the polarizer-attached optical fiber connector adapter 64 is connected to a laser module whose extinction ratio is low, it becomes possible to produce laser light which has a high extinction ratio. In addition, since the polarizer 62 is the dichroic type, as described above, all of the unpolarized components are absorbed. Furthermore, the polarizer 62 is fixed at an angle inclined slightly from a plane vertical to the optical axes of the optical fiber portions 65a, 65b so that the return light reflected by the polarizer 62 is negligible. Therefore, the laser oscillation can be stably held. That is, it becomes possible to enhance the characteristics of ordinary laser modules.

The polarizer-attached optical fiber connector adapter 64 can also be employed as a common connector that is used in an optical transmission path. In this case, the extinction ratio of light propagating through an optical transmission path can be enhanced. In other words, the polarizer-attached optical fiber adapter fulfills the same function as the fiber polarizer.

The above-mentioned polarizer-attached optical fiber connector adapter 64 requires no addition of optical components and no special design, because it is manufactured by inserting and fixing the linear polarizer 62 into the adapter ferrule 63 employed in a commonly used adapter.

The effectiveness of the polarizer-attached optical fiber connector adapter 64 depends on the selection of the linear polarizer 62. As previously described, the linear polarizer 62 has to be very thin in order to minimize the coupling loss between it and the fiber. The linear polarizer 62 must also have a high extinction ratio and a large aperture. Furthermore, it is preferable that the linear polarizer 62 have a high resistance to laser irradiation. It is suitable that the linear polarizer 62 be the above-mentioned "UltraThin™" which is a dichroic glass polarizer.

"UltraThin™" has a thickness of about 30 $\mu$m, the extinction ratio thereof is 40 dB and the insertion loss thereof is 0.5 dB or less. That is, it is very thin but is a high-function polarizer with a high extinction ratio and a low insertion loss. "UltraThin™" also has a large light-receiving angle (±20°) and a large aperture diameter and has high resistance to laser irradiation. "UltraThin™" further has a refractive index close to the refractive index of the core of the common optical fiber 65a or 65b. The advantage of having a large acceptance angle is that the inclined angle of the linear polarizer 62 (where 5° is preferred) with respect to the axial direction of the optical fibers 65a, 65b can be effectively selected so that the return light, which are reflected at the optical fibers 65a, 65b and the liner polarizer 62, is suppressed. The advantage of having a large aperture diameter is that the assembly step becomes simple. The advantage of having high laser resistance is that the polarizer can be used even when a high-power laser beam is employed. Since the refractive index of "UltraThin™" is nearly the same as that of the core of the optical fiber, the insertion loss due to insertion of "UltraThin™" can be reduced. Furthermore, the shift of the optical axis of the fiber due to the inclination of the linear polarizer 62 is so small that it is negligible.

As described above, since no suitable linear polarizer had been put into practical use, it has not been considered possible to install a linear polarizer in an adapter which is a relatively small optical component. The polarizer-attached optical fiber connector adapter 64 according to the present invention is capable of providing a laser beam which has a high extinction ratio, by being applied to currently used light sources and optical signal paths without addition of a lens, etc.

What is claimed is:

1. A polarizer-attached optical fiber ferrule comprising:
   an optical fiber;
   a ferrule, fitted on the periphery of said optical fiber, and equipped with a slit reaching said optical fiber; and
   a linear polarizer having a thickness no greater than 50 $\mu$m inserted into said slit so that it crosses said optical fiber.

2. The polarizer-attached optical fiber ferrule as set forth in claim 1, wherein said linear polarizer is a dichroic glass polarizer.

3. The polarizer-attached optical fiber ferrule as set forth in claim 1, wherein said slit is inclined with respect to an axial direction of said optical fiber.

4. The polarizer-attached optical fiber ferrule as set forth in claim 1, wherein said fiber is a single mode fiber.

5. The polarizer-attached optical fiber ferrule as set forth in claim 1, wherein said fiber is a polarization maintaining fiber.

6. The polarizer-attached optical fiber ferrule as set forth in claim 1, wherein said linear polarizer that is inserted has a polarizing angle which aligns with a polarization direction of a laser beam.

7. The polarizer-attached optical fiber ferrule as set forth in claim 1, wherein said optical fiber comprises two or more optical fibers.

8. A polarizer-attached optical fiber connector comprising:
   an optical fiber;
   a connector ferrule, fitted on the periphery of said optical fiber, and equipped with a slit reaching said optical fiber; and
   a linear polarizer having a thickness no greater than 50 $\mu$m inserted into said slit so that it crosses said optical fiber.

9. The polarizer-attached optical fiber connector as set forth in claim 8, wherein said linear polarizer is a dichroic glass polarizer.

10. The polarizer-attached optical fiber connector as set forth in claim 8, wherein said slit is inclined with respect to an axial direction of said optical fiber.

11. The polarizer-attached optical fiber connector as set forth in claim 8, wherein said fiber is a single mode fiber.

12. The polarizer-attached optical fiber connector as set forth in claim 8, wherein said fiber is a polarization maintaining fiber.

13. The polarizer-attached optical fiber connector as set forth in claim 8, wherein said linear polarizer that is inserted has a polarizing angle which aligns with a polarization direction of a laser beam.

14. The polarizer-attached optical fiber connector as set forth in claim 8, wherein said optical fiber comprises two or more optical fibers.

15. A polarizer-attached optical fiber connector adapter comprising:

an optical fiber;

two adapter ferrules fitted on the periphery of said optical fiber and fixed within an alignment sleeve; and a linear polarizer inserted between said ferrules;

wherein said fiber is a polarization maintaining fiber.

16. A polarizer-attached optical fiber connector adapter comprising:

an optical fiber;

an adapter ferrule, fitted on the periphery of said optical fiber, and equipped with a slit reaching said optical fiber; and a linear polarizer having a thickness no greater than 50 $\mu$m inserted into said slit so that it crosses said optical fiber.

17. The polarizer-attached optical fiber connector adapter as set forth in claim 16, wherein said linear polarizer is a dichroic glass polarizer.

18. The polarizer-attached optical fiber connector adapter as set forth in claim 16, wherein said slit is inclined with respect to an axial direction of said optical fiber.

19. The polarizer-attached optical fiber connector adapter as set forth in claim 16, wherein said fiber is a single-mode fiber.

20. The polarizer-attached optical fiber connector adapter as set forth in claim 16, wherein said fiber is a polarization maintaining fiber.

21. The polarizer-attached optical fiber connector adapter as set forth in claim 16, wherein said optical fiber comprises two or more optical fibers.

* * * * *